May 6, 1952     S. M. KASS     2,595,856
FAUCET
Filed Sept. 11, 1946
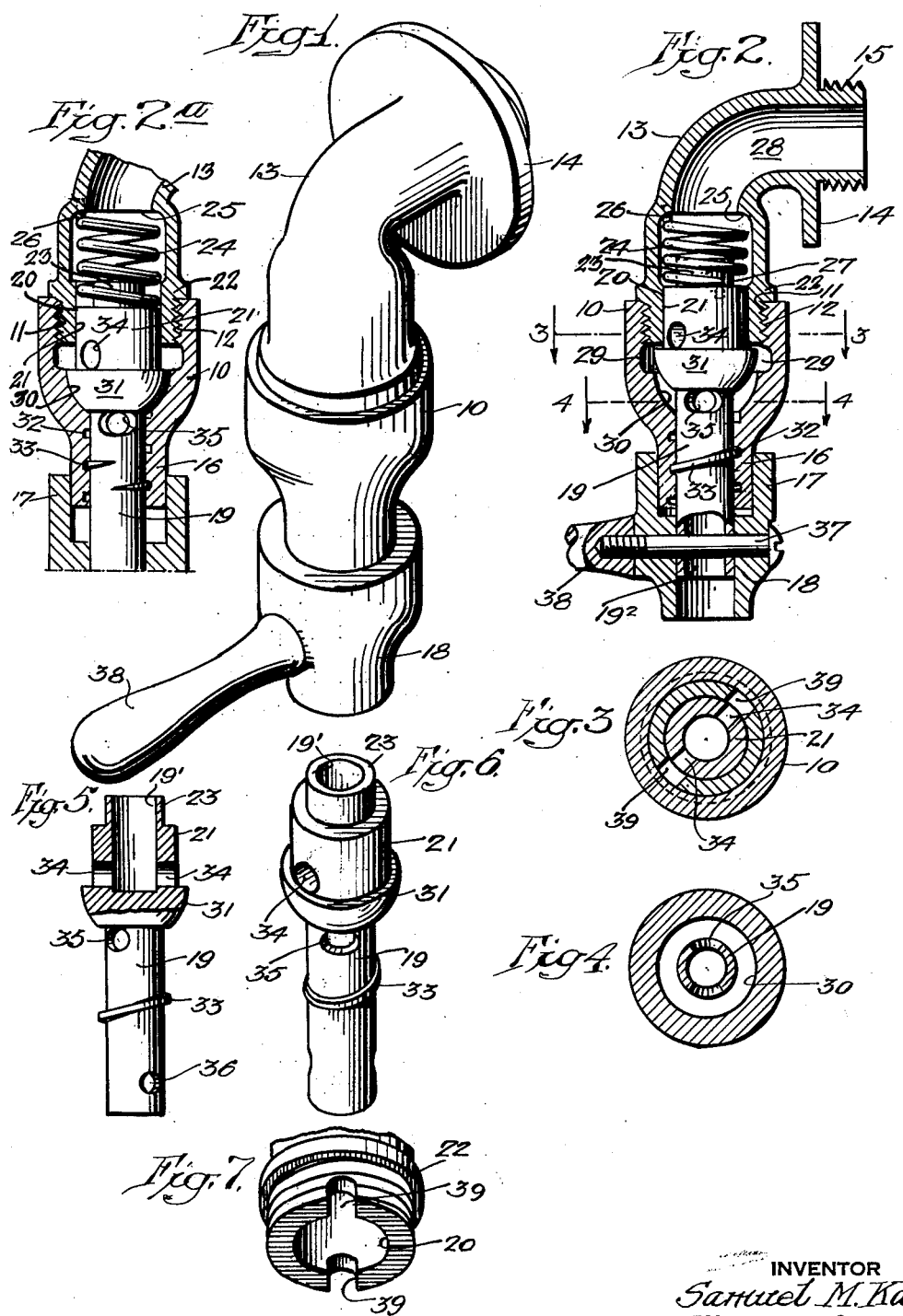
INVENTOR
Samuel M. Kass
BY
ATTORNEYS Patented May 6, 1952

2,595,856

UNITED STATES PATENT OFFICE 2,595,856

FAUCET

Samuel M. Kass, Philadelphia, Pa.

Application September 11, 1946, Serial No. 696,214

1 Claim. (Cl. 251—115)

My invention relates to plumber's bibs or faucets.

The purpose of my invention is to seat a valve positively with tight closure by a quick acting movement of an operating spindle on the valve itself at the outlet end A further purpose is to use a water distributing member in the form of a handle fastener at the end of the valve.

A further purpose is to place a quick acting threaded spindle within a valve body to be operated by movement of the outlet or nozzle end of the faucet.

A further purpose is to urge a spindle valve to closing position under manual operation of a nozzle attached to the operating handle of a faucet.

A further purpose is to control water flow from a faucet by torque applied at or adjacent the discharge nozzle of the faucet, and preferably to a lever extension on the discharge nozzle which manipulates a valve positioned in the line of water flow above the discharge nozzle.

A further purpose is to mount a self-closing, manually opened faucet having torque control means for manually opening, located adjacent the discharge nozzle, with a valve seat and cooperating valve above the discharge nozzle, and spring closure means located above the valve and valve seat.

Other purposes will appear in the specification and in the claim.

Referring to the drawings:

Figure 1 is a perspective view of my improved bib or faucet.

Figures 2 and 2ª are vertical sectional views of the structure of Figure 1, in open and closed positions, respectively.

Figure 3 is a sectional plan view taken on the line 3—3 of Figure 2.

Figure 4 is a sectional plan view taken on the line 4—4 of Figure 2.

Figure 5 is a side elevation, partly in section of the spindle used in my invention.

Figure 6 is a perspective view of the spindle seen in Figure 5.

Figure 7 is a fragmentary inverted perspective view of an elbow fitting used in my invention.

My invention relates to bibs or faucets which are used for quick control of water flow from pipes, particularly where water is under pressure.

In faucets of this type it is desirable to have a stem or spindle which carries a valve seat which can be quickly and accurately moved to and from contact to shut off or turn on the flow of water.

By my invention I provide a faucet body 10 internally threaded at 11, to receive the externally threaded end 12 of an elbow fitting 13. The fitting 13 is flanged at 14 and externally threaded at 15 for connection to a supply source.

The body 10 has its opposite end 16 reduced in diameter to receive and guide one end 17 of a nozzle or outlet fitting 18 hereinafter described.

A valve spindle or stem 19 has a bearing surface 20 which makes a close fit against a bearing surface 21 in one end 22 of the elbow 13. A reduced extension 23 from the spindle acts as a guide for a coiled torsion spring 24 placed within a recess 25. The spring is fastened at one of its ends 26 to the interior of the elbow 13 and at its other end 27 to the spindle 19.

The elbow 13 is also provided with a water inlet opening 28.

The valve body 10 is recessed at 29 above a seat 30. The seat 30 receives the valve closure 31 upon the stem 19, when the stem is rotated.

The lower end 16 of the valve body is interiorly threaded at 32 to receive the threads 33 of the spindle.

In Figure 5, I have illustrated the spindle 19 in detail with its bearing surface 21 in cross section. In this view it will be obvious that the extension 23 is hollow to a point below the lateral openings 34. The stem 19 below the valve seat is also hollow as clearly seen in Figure 4 with radial openings 35 at one end. The valve closure is of solid material.

The nozzle 18 which is fastened to the stem 19 is held in place on the stem by means of a bolt 37 which passes through the stem 19, with the projecting end of the bolt inserted into an operating handle 38.

It will be noted that by my valve construction it is not necessary to have washers or gaskets of any type to make a close fitting valve structure as the valve seat described with the valve member upon the stem makes a very tight and close fitting seal.

In operation my faucet is screwed into the water supply pipe by use of the threaded end 15 cooperating with the supply pipe. Water flows through the inlet 28 into the enlarged opening 25. This water exerts a certain amount of pressure against the end of the bearing surface 21 to aid in pushing the valve stem downwardly, especially when the valve is in its closed position.

The water coming in through the supply pipe and into the enlarged opening 25 will flow into the hollow portion 19' of the stem 19 and outwardly through the radial openings 34. When the valve is in the closed position, the water will be trapped in the opening above the valve seat. Upon longitudinal movement of the valve stem the water will be allowed to flow around the valve closure and into the opening 35 and then continue through the hollow portion 19² of the spindle. At this point the water flow is interrupted by the bolt. This acts as a distributor for the water passing out of the nozzle 18.

In Figure 2 the valve is shown in its open position where the water under pressure would be allowed to flow continuously.

The threads 33 upon the spindle provide a sure and quick movement of the spindle to open and close the valve. The rotary movement of the nozzle 18 will move the valve closure into and out of contact with the valve closure seat.

In Figure 2 the valve closure is shown away from its seat, allowing the water to flow uninterruptedly through the inlet opening 28, then through the hollow portion 19' of the valve stem, outwardly through the openings 34 into the recess 29, into the valve seat 30 and about the stem 19, into the openings 35 and then through the hollow end 19² of the valve stem from which it emerges through the nozzle 18.

In Figure 2ª the valve closure is shown as seated. To pass through the valve, water has to flow across the valve seat, and therefore in this valve position the water cannot go any further than into the recess 29.

The spring 24 is secured, as stated before, between the elbow and the end of the bearing surface of the valve. It will be noted that, when the valve stem is turned to open position through the handle 38, it will be turned against the action of the spring 24. In other words, the spring 24 always tends to press the valve closure toward seating position within the valve, because the spring holds the valve stem against rotary movement. If when the valve is open the handle is released the spring will cause the valve closure to return to closed position.

It will also be noted that when the faucet is turned on it will be necessary for the operator to hold the valve open as long as he desires to have the water flow through the faucet.

When the nozzle end of the faucet is turned laterally it is always turned against the pressure of the spring and also moved against the pressure of the supply of liquid.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a faucet, a casing having a straight downwardly extending hollow interior from an inlet end at the top to an outlet end at the bottom, having a spring chamber near the top, having a guiding bore below the spring chamber, having a valve chamber below the bore, having a valve seat below the valve chamber and having an internal thread below the valve seat, a unitary straight valve spindle in the chamber, having a guiding portion cooperating with the guiding bore of the chamber, having ports extending longitudinally and outwardly from the spring chamber to the exterior of the valve element at the valve chamber, having a valve closure below the ports above mentioned, the valve closure cooperating with the valve seat, having ports extending inwardly and longitudinally below the valve closure to the discharge end, and having an external thread thereon cooperating with the internal thread on the casing, a handle connected to the valve spindle at the lower end for turning the same, and a torsion spring in the spring chamber connected to the casing and to the valve spindle.

SAMUEL M. KASS.

REFERENCES CITED

The following references are of record in the file of this patent:

UNITED STATES PATENTS

| Number | Name | Date |
|---|---|---|
| 649,457 | Howes | May 15, 1900 |
| 829,524 | Happ | Aug. 28, 1906 |
| 1,234,096 | Farrell | July 17, 1917 |
| 1,345,032 | Smith | June 29, 1920 |
| 1,759,904 | Kass | May 27, 1930 |
| 2,389,297 | Crevatin | Nov. 20, 1945 |